United States Patent
Jain et al.

(10) Patent No.: US 12,546,290 B2
(45) Date of Patent: Feb. 10, 2026

(54) SYSTEM AND METHOD FOR MONITORING WIND TURBINE ROTOR BLADES USING INFRARED IMAGING AND MACHINE LEARNING

(71) Applicant: LM Wind Power A/S, Kolding (DK)

(72) Inventors: Arpit Jain, Dublin, CA (US); Feng Xue, Clifton Park, NY (US); Michael John MacDonald, Albany, NY (US); Xiao Bian, Santa Clara, CA (US); Venkata Vijayaraghava Nalladega, Watervliet, NY (US); Gary Anthony Miller, Randers (DK)

(73) Assignee: LM Wind Power A/S, Kolding (DK)

( * ) Notice: Subject to any disclaimer, the term of this patent is extended or adjusted under 35 U.S.C. 154(b) by 504 days.

(21) Appl. No.: 17/802,365

(22) PCT Filed: Feb. 27, 2020

(86) PCT No.: PCT/US2020/020111
§ 371 (c)(1),
(2) Date: Aug. 25, 2022

(87) PCT Pub. No.: WO2021/173138
PCT Pub. Date: Sep. 2, 2021

(65) Prior Publication Data
US 2023/0107092 A1 Apr. 6, 2023

(51) Int. Cl.
*F03D 17/00* (2016.01)
*G01N 21/95* (2006.01)
(Continued)

(52) U.S. Cl.
CPC ............. *F03D 17/00* (2016.05); *G01N 21/95* (2013.01); *G06T 7/0004* (2013.01);
(Continued)

(58) Field of Classification Search
CPC ........ F03D 17/00; G06V 10/82; G06V 20/52; G06V 20/70; F05B 2270/709;
(Continued)

(56) References Cited

U.S. PATENT DOCUMENTS 6,796,709 B2   9/2004  Choi
7,432,505 B2  10/2008  Brummel
(Continued)

FOREIGN PATENT DOCUMENTS

CN    103984956 B    7/2017
DE  102011017564 A1  10/2012
(Continued)

OTHER PUBLICATIONS

Janssens et al., Deep Learning for Infrared Thermal Image Based Machine Health Monitoring, IEEE/ASME Transactions on Mechatronics, vol. 23, Issue 1, Feb. 2018, pp. 151-159 (Year: 2018).*
(Continued)

*Primary Examiner* — Shefali D Goradia
(74) *Attorney, Agent, or Firm* — Dority & Manning, P.A.

(57) ABSTRACT

A method for monitoring a rotor assembly of a wind turbine includes receiving, via an imaging analytics module of a controller, thermal imaging data of the rotor assembly that includes a plurality of image frames. The method includes automatically identifying, via a first machine learning model of the imaging analytics module, a plurality of sections of a rotor blade of the rotor assembly within the plurality of image frames until all sections of the rotor blade are identified. Further, the method includes selecting, via a function of the imaging analytics module, a subset of image frames from the plurality of image frames, the subset of image frames comprising a minimum number of the plurality of image frames required to represent all sections of the rotor blade. Moreover, the method includes generating, via a
(Continued)

visualization module of the controller, an image of the rotor assembly using the subset of image frames.

11 Claims, 9 Drawing Sheets

(51) Int. Cl.
| | |
|---|---|
| *G06T 7/00* | (2017.01) |
| *G06V 10/26* | (2022.01) |
| *G06V 10/774* | (2022.01) |
| *G06V 10/82* | (2022.01) |
| *G06V 20/52* | (2022.01) |
| *G06V 20/70* | (2022.01) |

(52) U.S. Cl.
CPC .......... *G06V 10/267* (2022.01); *G06V 10/774* (2022.01); *G06V 10/82* (2022.01); *G06V 20/52* (2022.01); *G06V 20/70* (2022.01); *F05B 2270/709* (2013.01); *F05B 2270/8041* (2013.01); *G06T 2207/10048* (2013.01); *G06T 2207/20076* (2013.01); *G06T 2207/20081* (2013.01); *G06T 2207/20084* (2013.01)

(58) Field of Classification Search
CPC .............. F05B 2270/8041; G06T 2207/10048; G06T 2207/20081; G06T 2207/20084; Y02E 10/72

See application file for complete search history.

(56) References Cited

U.S. PATENT DOCUMENTS

| | | | |
|---|---|---|---|
| 8,171,809 B2* | 5/2012 | Fritz | F03D 17/00 |
| | | | 73/865.8 |
| 9,004,753 B1 | 4/2015 | Maresca, Jr. et al. | |
| 9,652,839 B2 | 5/2017 | Newman | |
| 9,976,967 B2 | 5/2018 | Bense et al. | |
| 10,338,553 B2 | 7/2019 | Cella et al. | |
| 10,346,725 B2 | 7/2019 | Weller et al. | |
| 10,656,096 B2 | 5/2020 | Naderhirn et al. | |
| 11,047,368 B2* | 6/2021 | Hoare | G06T 19/003 |
| 2011/0140060 A1* | 6/2011 | Olson | F03D 80/50 |
| | | | 254/394 |
| 2012/0076345 A1* | 3/2012 | Fritz | F03D 80/50 |
| | | | 382/100 |
| 2019/0042900 A1 | 2/2019 | Smith et al. | |
| 2019/0294923 A1 | 9/2019 | Riley et al. | |
| 2020/0325878 A1* | 10/2020 | Danko | B08B 1/30 |
| 2021/0071647 A1* | 3/2021 | Girolamo | H04N 23/54 |
| 2021/0350521 A1* | 11/2021 | Bach-Andersen | F03D 80/50 |
| 2022/0299013 A1* | 9/2022 | Tovar | G01N 29/07 |

FOREIGN PATENT DOCUMENTS

| | | |
|---|---|---|
| EP | 3009823 B1 | 2/2019 |
| EP | 3453874 A1 | 3/2019 |
| EP | 3605453 A1 | 2/2020 |
| JP | 2018181235 A | 11/2018 |
| WO | WO2018215103 A1 | 11/2018 |
| WO | WO 2019/216975 A1 | 11/2019 |

OTHER PUBLICATIONS

PCT International Search Report & Opinion Corresponding to PCT/US2020/020111 on Nov. 16, 2020.

Abhishek et al., Detection of Cracks and Damage in Wind Turbine Blades Using Artificial Intelligence-Based Image Analytics, Measurement, vol. 147, 2019, pp. 1-21. https://doi.org/10.1016/j.measurement.2019.07.051.

Keerthi et al., Machine Health Monitoring Using Infrared Thermal Image by Convolution Neural Network, International Journal of Engineering Research & Technology (IJERT), 2278-0181, vol. 6, Issue 7, 2018, pp. 01-05. https://www.ijert.org/research/machine-health-monitoring-using-infrared-thermal-image-by-convolution-neural-network-JJERTCONV6IS07026.pdf.

Zhang et al., Study on Wind Turbine Blade Defect Detection System Based on Imaging Array, E3S Web Conference, 2019 4th International Conference on Advances in Energy and Environment Research (ICAEER 2019), vol. 118, Oct. 4, 2019, pp. 01-04. https://dx.doi.org/10.1051/e3sconf/201911802041.

Indian Office Action, Mar. 13, 2025.

* cited by examiner

SYSTEM AND METHOD FOR MONITORING WIND TURBINE ROTOR BLADES USING INFRARED IMAGING AND MACHINE LEARNING

RELATED APPLICATIONS

The present application claims priority to PCT Application Serial Number PCT/US2020/020111, filed on Feb. 27, 2020, which is incorporated by reference herein.

FIELD

The present disclosure relates generally to wind farms and, more particularly, to a system and method for monitoring wind turbine rotor blades using infrared imaging and machine learning techniques.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, the various wind turbine components are subjected to a variety of loads. In particular, the rotor blades are subjected to both extreme and fatigue loading. Though the rotor blades are designed to withstand a certain amount of loading, wind conditions are not always predictable and can cause excessive blade damage. In worst case scenarios, blade damage can cause the entire wind turbine to be shut down such that appropriate repair measures can be scheduled. Such downtime causes a loss of annual energy production and is quite expensive.

Accordingly, it is advantageous to monitor blade health during operation of the wind turbine. Conventional systems employ sensors for monitoring certain characteristics of the blade and/or changes thereof overtime. For example, in certain instances, strain gauges may be employed for monitoring deflections in the rotor blades. In other examples, sensors may be mounted to the tower that monitor a distance of the blade tips of the rotor blades as the blades rotate about the hub. In such embodiments, if the distance changes overtime, blade damage may be inferred, and appropriate control action may be implemented.

Advances in monitoring blade health has been made in recent years but are not without issue. For example, infrared imaging has recently become more popular, yet the ability to analyze the large, cumbersome amounts of data associated with such imaging has proved to be too time-consuming and costly to be advantageous.

Accordingly, a system and method that addresses the aforementioned issues would be advantageous. Thus, the present disclosure is directed a system and method for monitoring wind turbine rotor blades using infrared imaging and machine learning techniques.

BRIEF DESCRIPTION

Aspects and advantages of the invention will be set forth in part in the following description, or may be obvious from the description, or may be learned through practice of the invention.

In one aspect, the present disclosure is directed to a method for monitoring at least one rotor assembly of a wind turbine. For example, the rotor assembly may include any of a rotor having a rotatable hub with at least one rotor blade secured thereto. Thus, the method includes receiving, via an imaging analytics module of a controller, thermal imaging data of the rotor assembly. The thermal imaging data includes a plurality of image frames. The method also includes automatically identifying, via a first machine learning model of the imaging analytics module, a plurality of sections of the rotor assembly within the plurality of image frames until all sections of the rotor blade are identified. Further, the method includes selecting, via a function of the imaging analytics module, a subset of image frames from the plurality of image frames, the subset of image frames comprising a minimum number of the plurality of image frames required to represent all sections of the rotor blade. Moreover, the method includes generating, via a visualization module of the controller, an image of the rotor assembly using the subset of image frames.

In another aspect, the present disclosure is directed to a method for monitoring at least one rotor assembly of a wind turbine. The method includes, during a model-building time period, receiving, via an imaging analytics module of a controller, input data comprising a plurality of thermal images of the rotor assembly or another rotor assembly. The plurality of thermal images includes a plurality of image frames. The method also includes automatically identifying, via a machine learning model of the imaging analytics module, at least one anomaly and associated anomaly category information using the input data. Further, the method includes generating, via the imaging analytics module, output data comprising pixel information that corresponds to the at least one anomaly and the anomaly category information. Moreover, during a model-implementing time period, the method includes training the machine learning model over time using the input data and the output data. Thus, the method includes generating, via a visualization module of the controller, an image of the rotor assembly using the trained machine learning model. It should be understood that the method may include any one or more of the additional steps and/or features described herein.

In yet another aspect, the present disclosure is directed to a system for monitoring at least one rotor assembly of a wind turbine. The system includes a controller having an imaging analytics module configured to perform a plurality of operations and a visualization module. The plurality of operations includes, during a model-building time period, receiving input data comprising thermal imaging data of the rotor assembly, the thermal imaging data comprising a plurality of image frames, automatically identifying, via a machine learning model of the imaging analytics module, a plurality of sections of the rotor blade within the plurality of image frames until all sections of the rotor blade are identified, selecting, via a function of the imaging analytics module, a subset of image frames from the plurality of image frames, the subset of image frames comprising a minimum number of the plurality of image frames required to represent all sections of the rotor blade, automatically identifying, via the machine learning model, at least one anomaly and associated anomaly category information within the subset of image frames, generating output data comprising pixel information that corresponds to the at least one anomaly and the anomaly category information, and during a model-implementing time period, training the machine learning model over time using the input data and the output data. Further, the visualization module is configured to generate an image of the rotor assembly using the trained machine learning model. It should be understood that the system may include any one or more of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Infrared (IR) imaging provides the ability to detect sub-surface defects that cannot be seen with traditional imaging methods. As such, the present disclosure is directed to an imaging system that collects IR images of wind turbine blades. The imaging system can either be operated manually or automated using a sensor-based controller. Further, the imaging system of the preset disclosure provides deep-learning based automation tools for performing analysis of the collected IR wind turbine blade data. After collecting the IR data, the imaging system can automatically identify various components and can proceed to automatically identify blade sections within the images. After performing this analysis, the IR frames can be sub-sampled using a metric function so that a minimum set of critical frames is included for final analysis, thereby reducing the burden of the analysis. More particularly, the imaging system may use a deep-learning based system to automatically recognize defects or anomalies from the IR images.

Accordingly, the present disclosure provides many advantages over prior art systems. For example, IR videos present a host of challenges as compared to traditional video analysis, due to the lack of contrast and increased noise causing difficulty in identifying unique features between images. Thus, an advantage of using a deep-learning based approach according to the present disclosure to automatically analyze IR images is that the underlying models can improve over time given more data. Further, the system of the present disclosure is configured to automatically compress large blade inspection video files into selected key image frames, thereby reducing computational cost for analyzing the data for defect or human visual inspection. Thus, the system of the present disclosure is configured to reduce storage requirements for the data and can easily generate reports for users.

Figure 1:
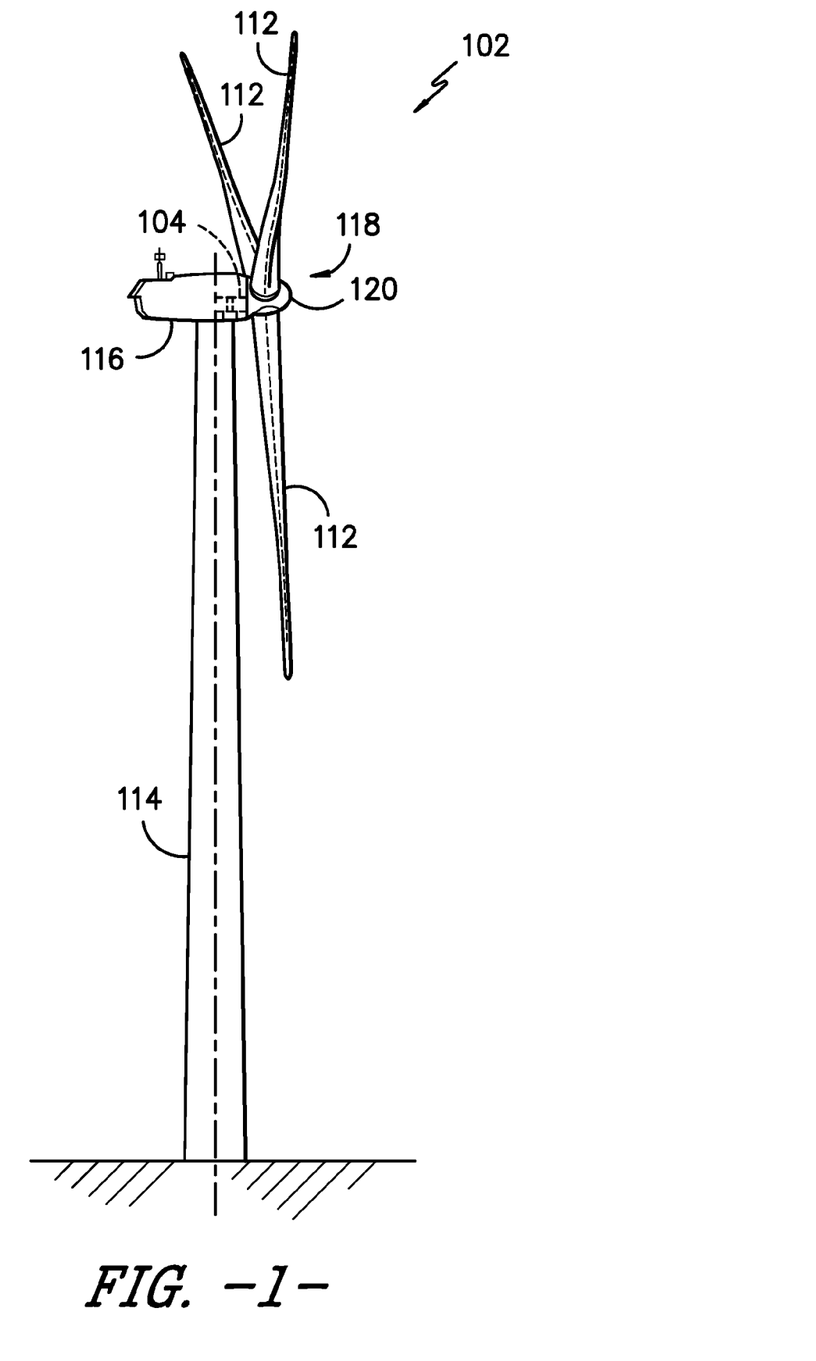
FIG. 1 illustrates a perspective view of one embodiment of a wind turbine according to the present disclosure.

Referring now to the drawings, FIG. 1 illustrates a perspective view of one embodiment of a wind turbine 102 according to the present disclosure. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 1 is provided for illustrative purposes only. Thus, one of ordinary skill in the art should understand that the invention is not limited to any particular type of wind turbine configuration.

Figure 2:
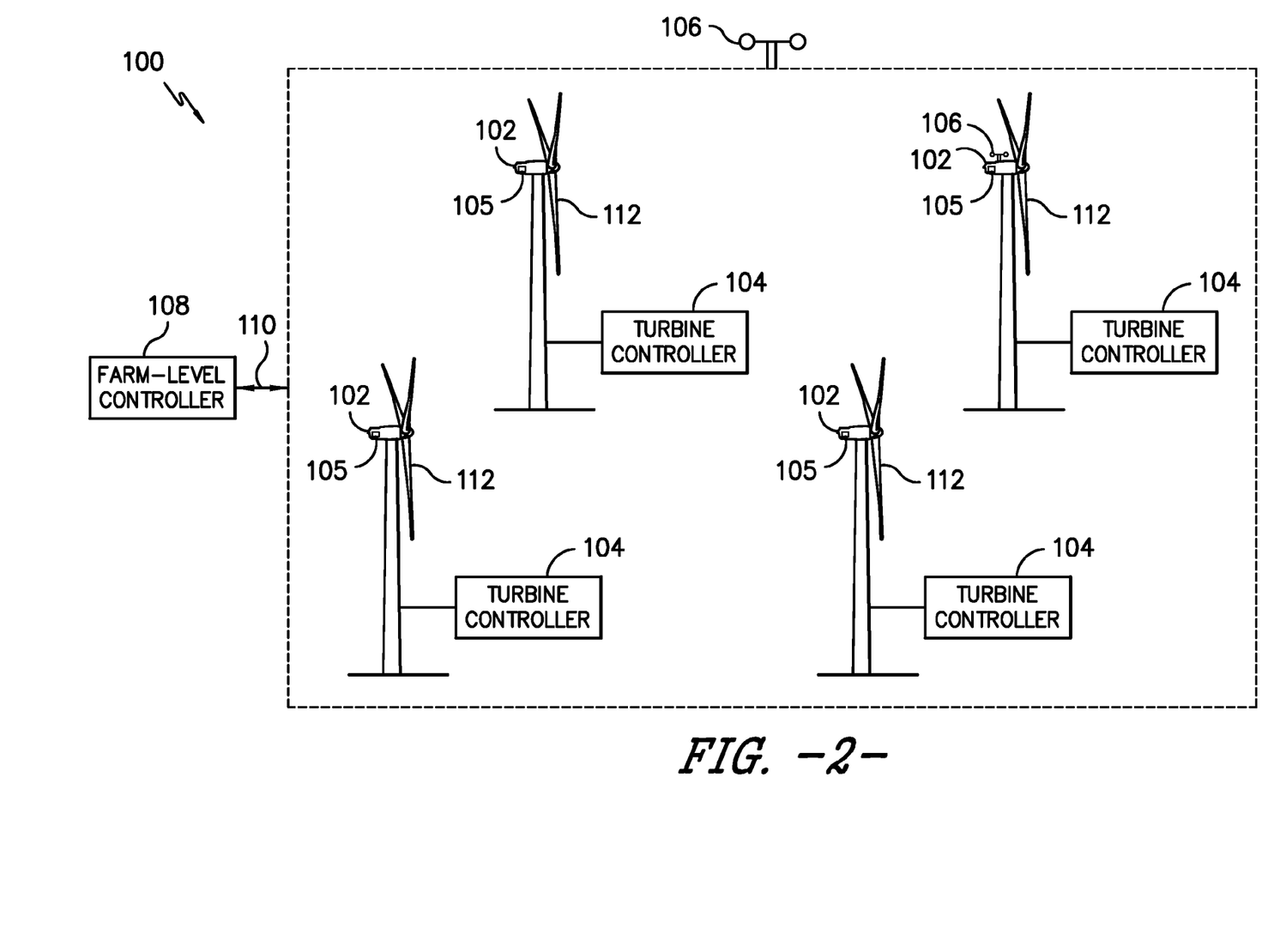
FIG. 2 illustrates a perspective view of one embodiment of a wind farm according to the present disclosure.

Referring now to FIG. 2, the wind turbine 102 may be part of a wind farm 100. More particularly, FIG. 2, illustrates a schematic diagram of one embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 2 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

As shown generally in the figures, each wind turbine 102 of the wind farm 100 may also include a turbine controller 104 communicatively coupled to a farm controller 108.

Moreover, in one embodiment, the farm controller 108 may be coupled to the turbine controllers 104 through a network 110 to facilitate communication between the various wind farm components. The wind turbines 102 may also include one or more sensors 105, 106, 107 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 3:
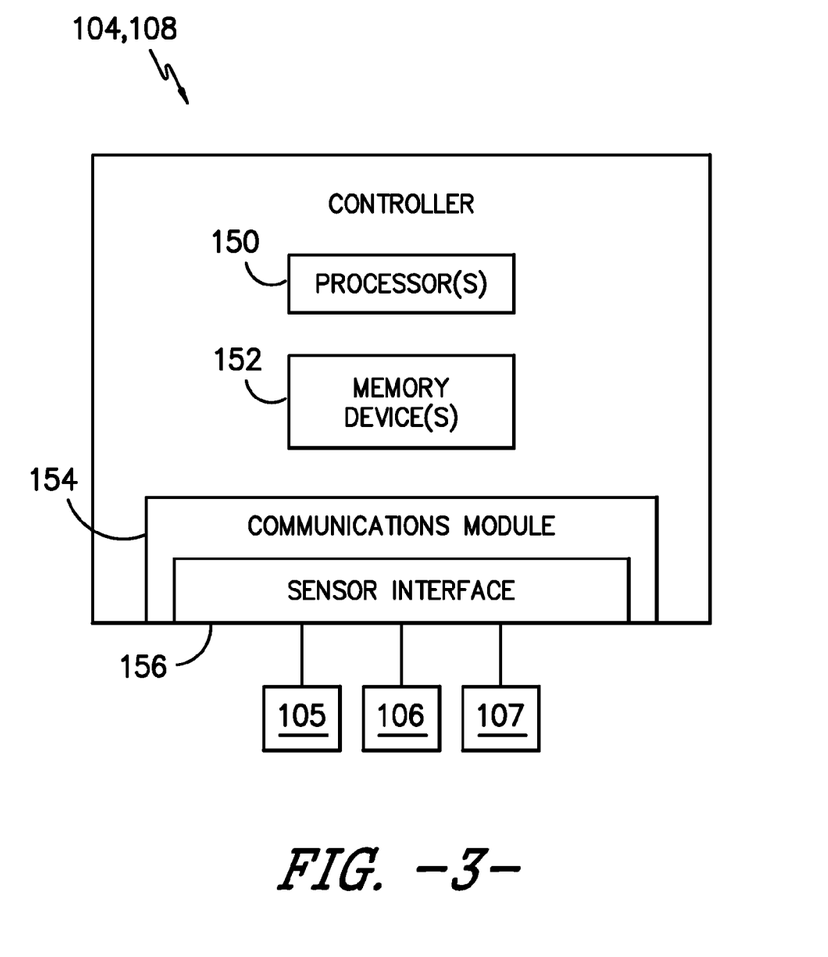
FIG. 3 illustrates a block diagram of one embodiment of a controller of a wind turbine and/or or wind farm according to the present disclosure.

Referring now to FIG. 3, there is illustrated a block diagram of one embodiment of suitable components that may be included within the farm controller 108, the turbine controller(s) 104, and/or other suitable controller according to the present disclosure. As shown, the controller(s) 104, 108 may include one or more processor(s) 150 and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106, 107 (such as the sensors described herein) to be converted into signals that can be understood and processed by the processors 150. It should be appreciated that the sensors 105, 106, 107 may be communicatively coupled to the communications module 154 using any suitable means. For example, as shown, the sensors 105, 106, 107 are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

Figure 4:
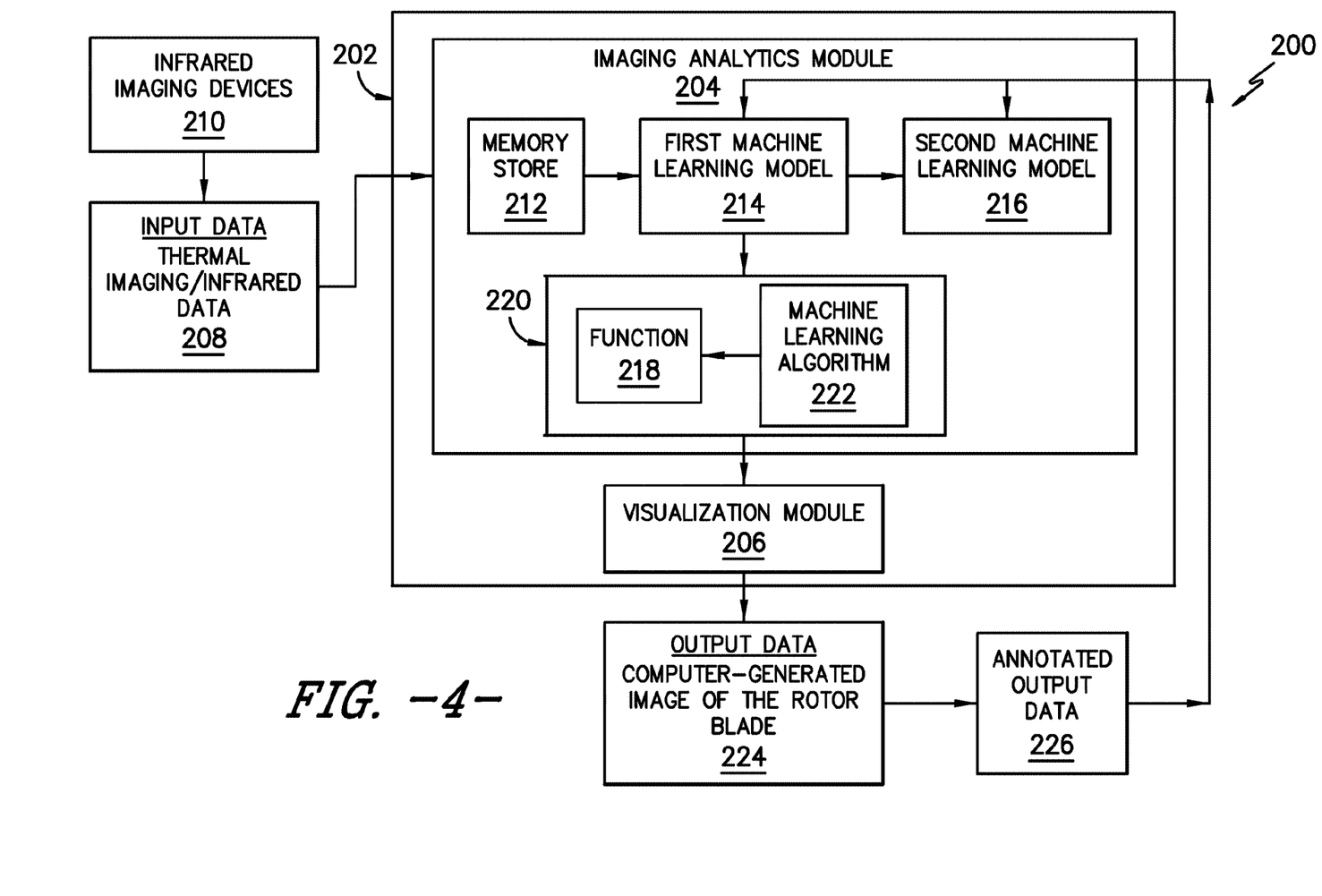
FIG. 4 illustrates a schematic diagram of one embodiment of a system for monitoring at least one rotor assembly of a wind turbine according to the present disclosure.
Figure 5:
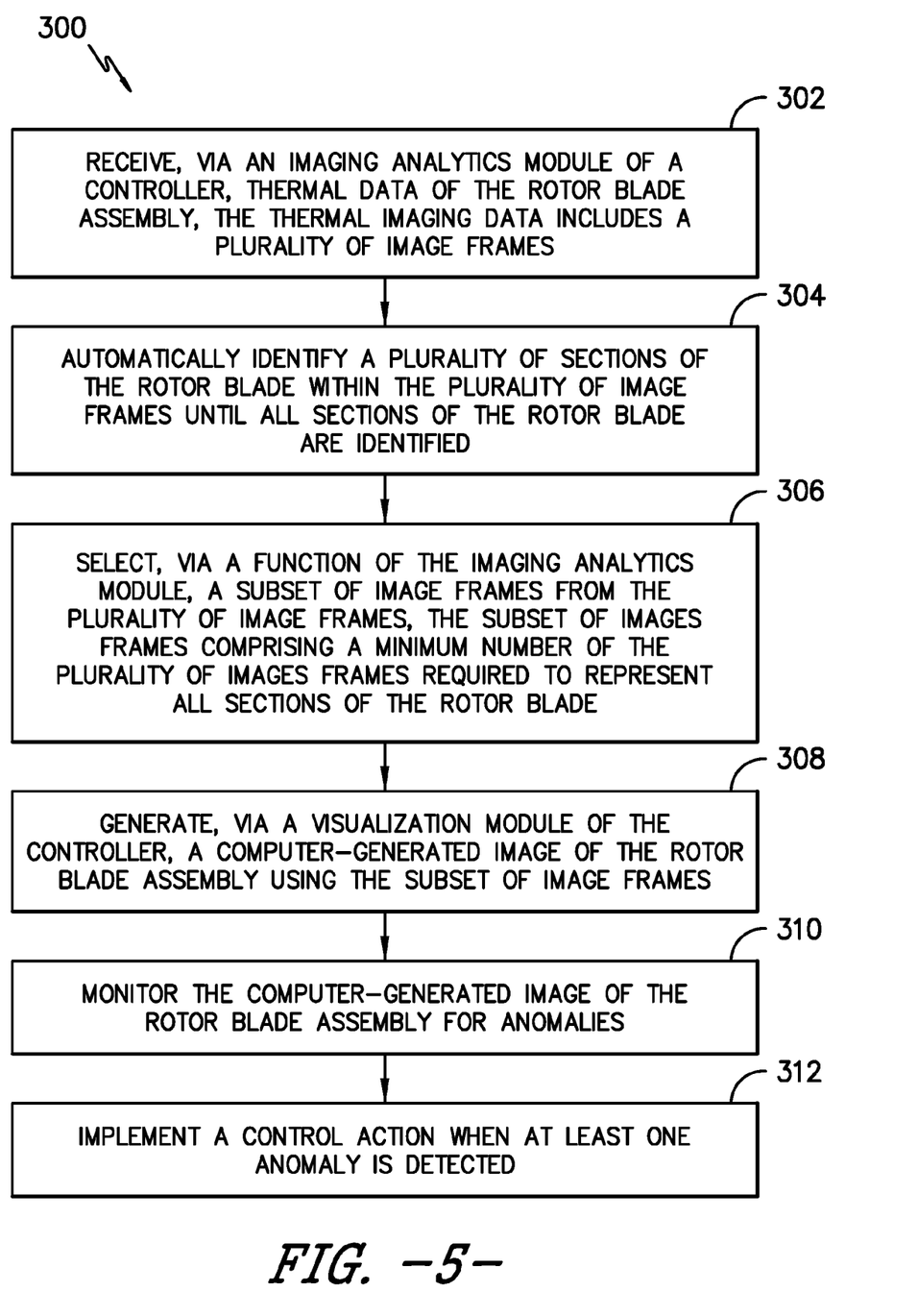
FIG. 5 illustrates a flow diagram of one embodiment of a method for monitoring at least one rotor assembly of a wind turbine according to the present disclosure.

Referring now to FIGS. 4 and 5, embodiments of a system 200 and method 300 for monitoring a rotor assembly of a wind turbine, such as one of the rotor 118, the hub 120, or one or more of the rotor blades 112 of the wind turbine 102, are illustrated. More specifically, FIG. 4, illustrates a schematic diagram of a system 200 for monitoring a rotor assembly of a wind turbine according to the present disclosure, whereas FIG. 5 illustrates a flow diagram of a method 300 for monitoring a rotor assembly of a wind turbine according to the present disclosure. In general, the system 200 includes a controller 202, such as the farm controller 108, the turbine controller(s) 104, and/or other suitable controller according to the present disclosure. Further, as shown, the controller 202 may include an imaging analytics module 204 and a visualization module 206, the functions of which are described in more detail below.

In general, as shown in FIG. 5, the method 300 is described herein as implemented for monitoring the rotor assembly of the wind turbine 102 described above. However, it should be appreciated that the disclosed method 300 may be used to monitor any other rotor assembly or component having any suitable configuration. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes receiving, via the imaging analytics module 204, input data 208 containing thermal imaging data of any of the rotor assembly of the wind turbine 102 or rotor assembly of another wind turbine. For example, as shown in FIG. 4, the input data/thermal imaging data 208 may include infrared imaging data having a plurality of image frames or videos. Thus, in certain embodiments, the method 300 may also include colleting the infrared imaging data by scanning the rotor assembly, e.g. via one or more infrared imaging devices 210 (such as an infrared camera). In particular embodiments, the data 208 may be collected using techniques described in U.S. Pat. No. 9,652,839 entitled "System and Method for Ground-Based Inspection of Wind Turbine Blades," which is incorporated herein by reference in its entirety. Thus, the thermal imaging data may include one or more scans of the suction and pressure sides of the rotor assembly so as to cover the entirety of the blade(s) 112 from the blade root to the blade tip. Furthermore, the data 208 may be optionally stored in video format (e.g. within a memory store 212) and then further processed by the imaging analytics module 204 to reduce the volume of data as described below.

More particularly and referring back to FIG. 5, as shown at (304), the method 300 includes automatically identifying a plurality of sections of the rotor blade(s) 112 within the plurality of image frames until all sections of the rotor blade(s) 112 are identified. For example, in an embodiment, the plurality of sections of the rotor blade(s) 112 may include, for example, a blade root section, an intermediate blade section, or a blade tip section. In addition, as shown in FIG. 5, the various sections may be automatically identified via a first machine learning model 214 of the imaging analytics module 204. In such embodiments, the first machine learning model 214 may include a deep learning neural network. Thus, the first machine learning model 214 is configured to receive the video frames and automatically identify different components in the image frames. In various embodiments, the first machine learning model 214 can be learned in a supervised, semi-supervised or in an unsupervised fashion. Moreover, there may be several architectural variants of the deep learning neural network, any of which can be applied for the classification task. Once the algorithm identifies different components of the blade(s) 112 in the video frames, the method 300 may include aggregating image frames of the plurality of image frames from common sections of the plurality of sections until each of the plurality of sections is represented. For example, in one embodiment, if the infrared image frames contain scans of three rotor blades, after the analytics is done, the imaging analytics module 204 may have three sets of image frames containing all of the images belonging to all three blades, which can be aggregated based on the various sections of the rotor blade. The aggregation of the frames depends on the scanning protocol followed by operator to scan the wind turbine 102.

In additional embodiments, the system 200 may also be able to automatically identify one or more components of the rotor blade(s) 112 within the plurality of image frames. Such components may include, for example, a blade root, a blade tip, a lug nut, a leading edge, a trailing edge, a pressure side, a suction side, or a maximum chord. For example, as shown in FIG. 5, the imaging analytics module 204 may include a second machine learning model 216 for automatically identifying certain components of the rotor blade(s) 112. In particular embodiments, for example, the second machine learning model 216 may automatically identify a blade axis of the rotor blade(s) 112 using the one or more components. More specifically, in an embodiment, the second machine learning model 216 may be configured to automatically identify the blade axis of the rotor blade(s) 112 using the one or more components by detecting a position of the lug nut or any other axis indicator (model may be adjusted to learn other nacelle and/or hub features) within the plurality of image frames and automatically identifying the blade axis of the rotor blade(s) 112 based on the position of the lug nut. Since the blade axis is defined by the position of the lug nut (or any other discernible features) on the wind turbine which defines the turbine axis relative to it, the second machine learning model 216 can determine which blade axis corresponds to the collected image frames.

It should be further understood that the various machine learning models described here may include one or more machine learning algorithms and may be part of a single model or multiple models. Moreover, the machine learning models described herein may include any suitable algorithm and/or statistical model (in addition to deep learning neural network), such as for example, stepwise linear regression. Generally, stepwise linear regression adds or removes features one at a time in an attempt to get the best regression model without over fitting. Further, stepwise regression typically has two variants, including forward and backward regression, both of which are within the scope of the invention. For example, forward stepwise regression is a step-by-step process of building a model by successive addition of predictor variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling a response variable.

Another statistical method that may be used to generate the machine learning models described herein may be an absolute shrinkage and selection operator (LASSO) algorithm. Generally, a LASSO algorithm minimizes the residual sum of squares subject to a constraint that the sum of the absolute value of the coefficients is smaller than a constant. Still another statistical algorithm that may be used to generate the model(s) is a M5 Prime (M5P) algorithm, which is a tree-based regression algorithm that is effective in many domains. For example, whereas stepwise linear regression produces a single global linear model for the data, tree based regression algorithms perform logical tests on features to form a tree structure. Generally, the M5P algorithm utilizes a linear regression model at each node of the tree, providing more specialized models. A machine learning model that necessarily includes direction may also be used along with the mean of the power ensemble group to determine entitlement (i.e., expectation of power). This can be considered an improvement over previous methods that filter data to specific direction sectors (which then form separate models for each sector). Other machine learning methods that may be used to generate the model(s) may also include Gaussian Process Models, Random Forest Models, Support Vector Machines, and/or a micro-service, which is discussed in more detail herein.

Referring still to FIG. 5, after the model(s) 214, 216 automatically identify the components and/or sections of the rotor blade(s) 112, as shown at (306), the method 300 includes selecting, via a function 218 of the imaging analytics module 204, a subset of image frames from the plurality of image frames. For example, as shown in FIG. 4, the output of the first and/or second machine learning models 214, 216 can be sent to a function module 220 containing the function 218 that determines the subset of data. Accordingly, the subset of image frames includes a minimum number of the plurality of image frames required to represent all sections of the rotor blade(s) 112, e.g. without duplicate image frames or with a reduced amount of duplicate images. In such embodiments, the function 218 of the imaging analytics module 204 (i.e. used to select the subset of image frames) may include, for example, a metric function or an image stitching function. In such embodiments, the metric function may include a normalized cross correlation, a sum of an absolute difference, optical flow, a learned distance metric function, or any other suitable function. Further, in an embodiment, as shown in FIG. 4, the method 300 may include training the function 218 via a machine learning algorithm 222.

Thus, referring back to FIG. 5, as shown at (308), the method 300 includes generating, via the visualization module 206, an image 224 of the rotor assembly using the subset of image frames. It should be understood that the visualization module described herein may include a physical display monitor, a web application, or any suitable display means. Accordingly, as shown in FIG. 4, the output data 224 of the visualization module 206 may include the image of the rotor assembly(s) 112, which is described in more detail below.

Figure 6:
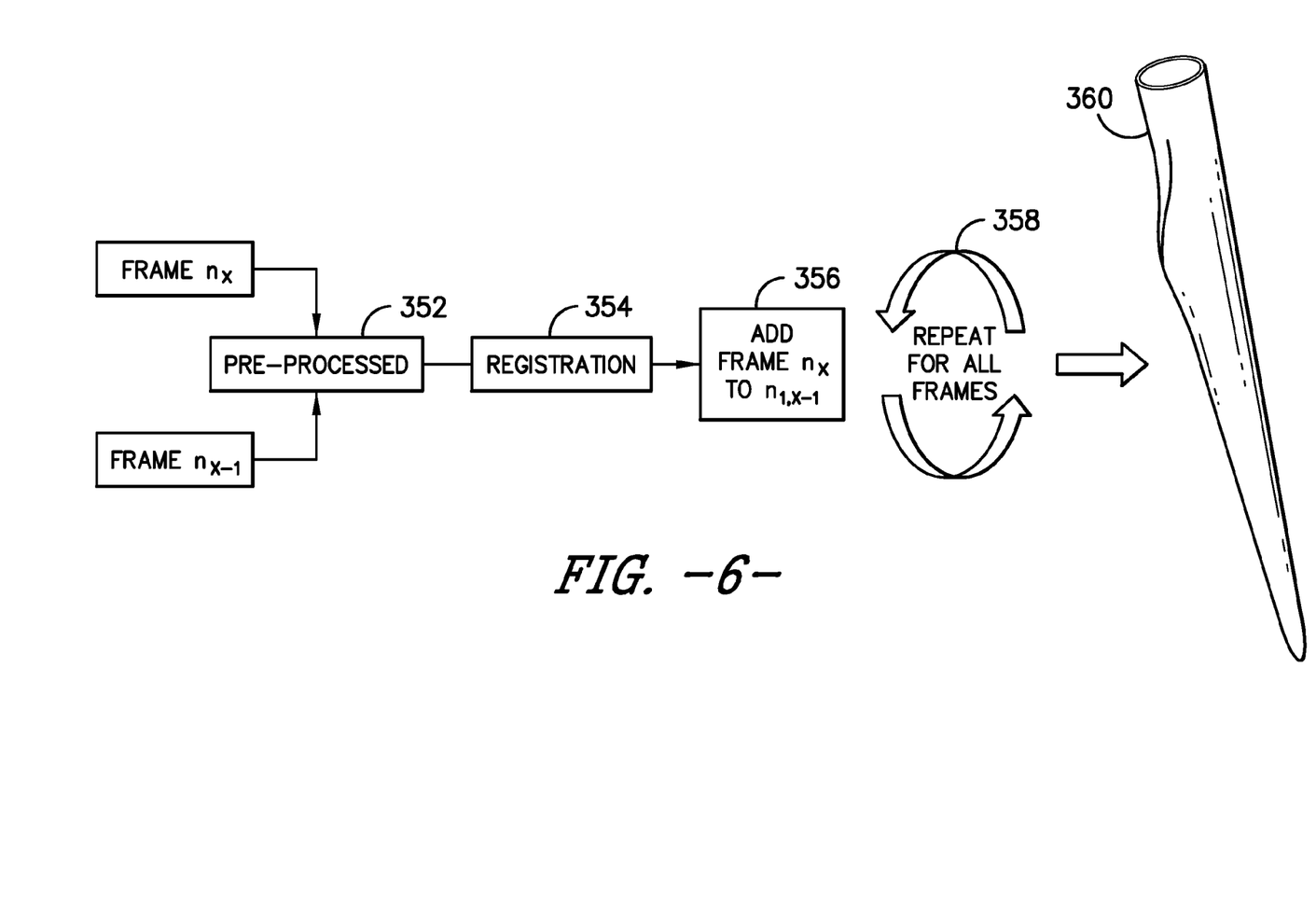
FIG. 6 illustrates a process flow diagram of one embodiment of an image stitching module of the system according to the present disclosure.

More particularly, FIG. 6 illustrates a process flow diagram of one embodiment of the image stitching function 350 that can be used to generate the entire computer-generated image 224 of the rotor assembly in one image is illustrated. Further, the image stitching function 350 can be used to determine the overlap between image frames and subsequently to decide whether a given image frame is a keyframe or not is illustrated. As shown, the image stitching function 350 is configured to learn the mapping of pixels from one image to another, thereby giving the information about the transformation the image undergoes during scanning. These can be used to decide whether sufficient movement is made by the operator to call out new image as the keyframe or discard it. More particularly, as shown in FIG. 6, a plurality of image frames are collected for various sections of the rotor blade(s) 112 (e.g. frame $n_x$, frame $n_{x-1}$, and so on). As shown at 352 and 354, the plurality of image frames can then be preprocessed and registered. For example, during registration, the image frames can be stitched together using an enhanced correlation-based registration approach. More particularly, as shown at 356, each image frame can be registered to the frame before it and then added cumulatively to all frames that were previously registered. Once this process is complete for all of the image frames (as shown at 358), the entire rotor blade can be visible in one stitched image (360). Since the defects are detected on individual frames, and the transformation matrix is known between each frame, the defect location on each frame is also known globally with respect to the entire wind turbine blade, which is further explained herein.

In addition, the method 300 may also include training the machine learning models 214, 216 described herein over time using the input data and/or output data 208, 224 of the imaging analytics module 204. For example, in general, there may be two parts of training, referred to herein as Phase I and Phase II. During Phase I, an initial set of training data is used to learn or develop and learn the machine learning models 214, 216. During Phase II, once the models 214, 216 start producing the output data, which can be visualized by an inspector and edited for mistakes, the annotated or edited data/images can be input into the machine learning models 214, 216 to continuously improve the models 214, 216 over time. More specifically, during Phase II, a human annotator can the annotate the output data 224 that can be input back into the imaging analytics module 204. As used herein, annotation in machine learning generally refers to a process of labelling data in a manner that can be recognized by machines or computers. Furthermore, such annotation can be completed manually by humans as human annotators generally better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning or clustering, as well as any other suitable accurate labeling process. Accordingly, as shown in FIG. 4, the annotated output data 226 can then be fed into the model(s) 214, 216 for training and/or correcting. In other cases, unsupervised learning methods, such as gaussian mixture model, sparse reconstruction or Neural network based autoencoders/generative adversarial network (GANs), may also be employed where algorithms learning a normal distribution of the data and can be used to flag the ones which are anomalous. It should also be understood that the machine learning models 214, 216 described herein may be trained via Phase I or Phase II only, rather than both.

In other words, the imaging analytics module 204 may include a supervised machine learning algorithm that can apply what has been learned in the past to new data using labeled data. Starting from the model build, the learning algorithm produces an inferred function to make predictions about the output values. As such, the imaging analytics module 204 is able to provide targets for any new input after sufficient training. The learning algorithm can also compare its output with the correct, intended output and find errors in order to modify the model accordingly.

Referring back to FIG. 4, as shown at (310), the method 300 may include monitoring the computer-generated image 224 of the rotor assembly for anomalies on the rotor assembly. Such monitoring may be further understood with reference to FIGS. 7 and 8 described herein. Thus, as shown at (312), the method 300 may include implementing a control action when at least one anomaly is detected. In one embodiment, for example, the control action may include generating an alarm. It should be understood that the control action as described herein may further encompass any suitable command or constraint by the controller 202. For example, in several embodiments, the control action may include temporarily de-rating or up-rating the wind turbine 102.

Up-rating or de-rating the wind turbine 102 may include speed up-rating or de-rating, torque up-rating or de-rating or a combination of both. Further, as mentioned, the wind turbine 102 may be uprated or de-rated by pitching one or more of the rotor blades 112 about its pitch axis. The wind turbine 102 may also be temporarily up-rated or de-rated by yawing the nacelle 116 to change the angle of the nacelle 116 relative to the direction of the wind. In further embodiments, the controller 202 may be configured to actuate one or more mechanical brake(s) in order to reduce the rotational speed of the rotor blades 112. In still further embodiments, the controller 202 may be configured to perform any appropriate control action known in the art. Further, the controller 202 may implement a combination of two or more control actions.

Figure 7:
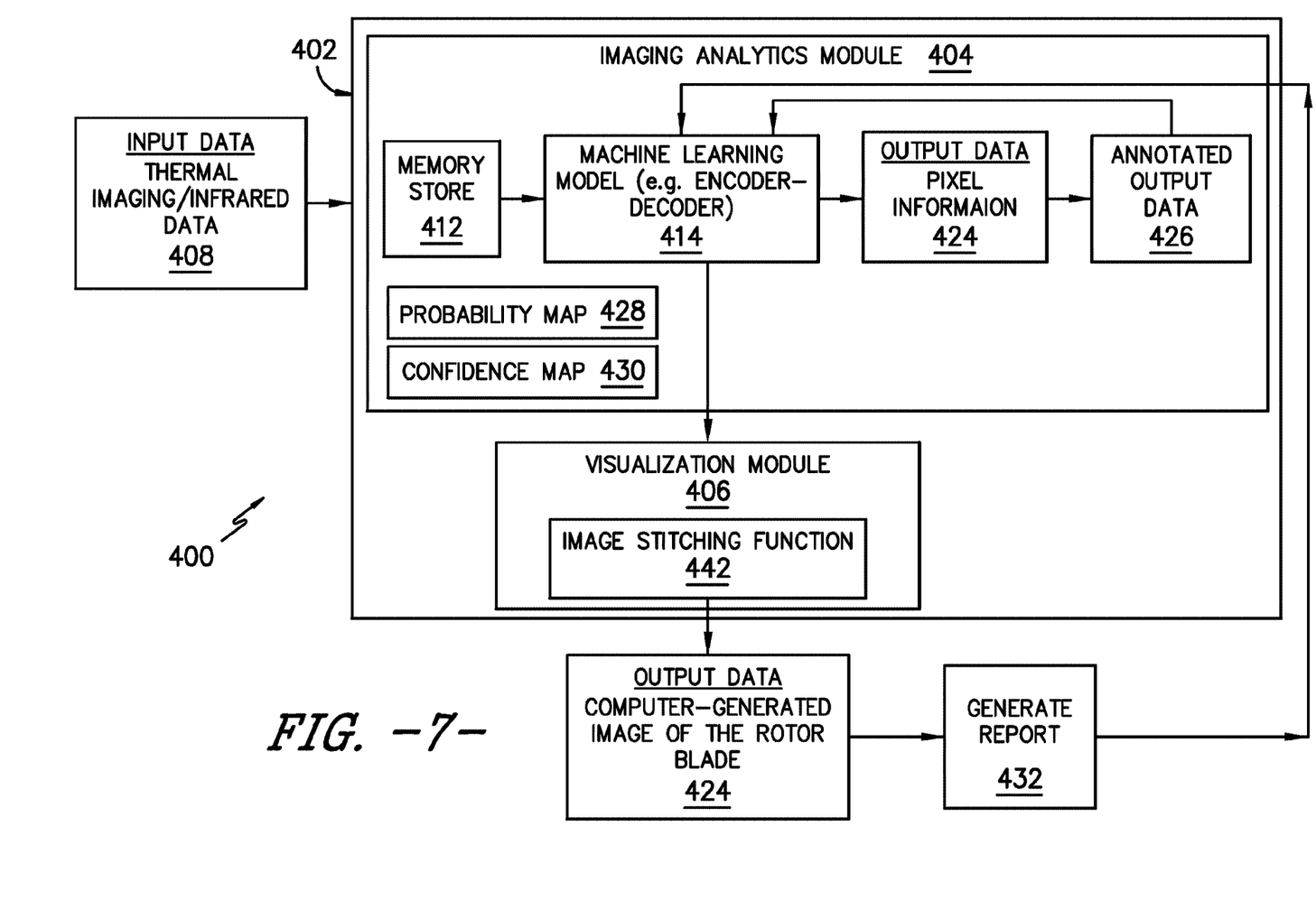
FIG. 7 illustrates a schematic diagram of another embodiment of a system for monitoring at least one rotor assembly of a wind turbine according to the present disclosure.
Figure 8:
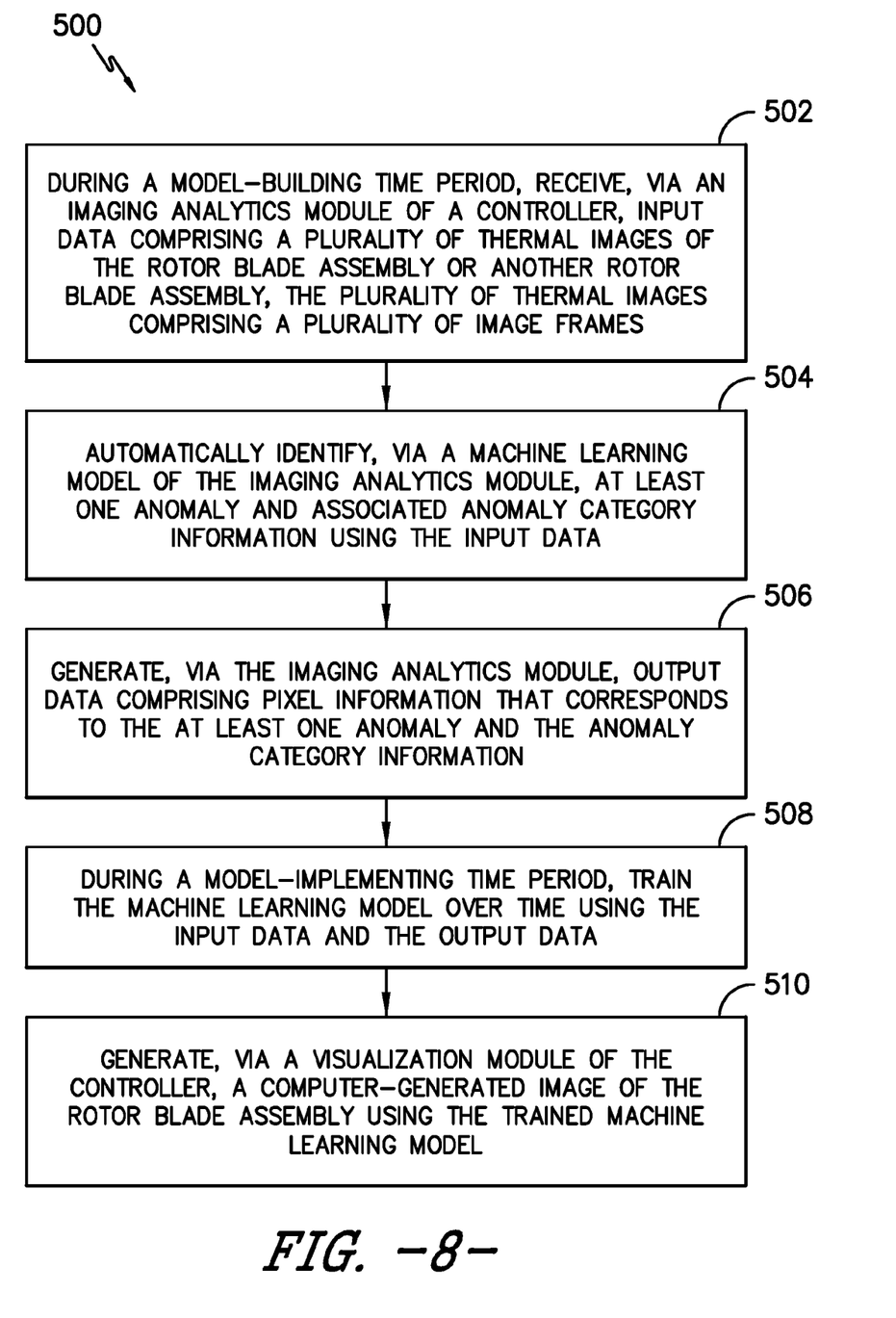
FIG. 8 illustrates a flow diagram of another embodiment of a method for monitoring at least one rotor assembly of a wind turbine according to the present disclosure.

Referring now to FIGS. 7 and 8, further embodiments of a system 400 and a method 500 for monitoring a rotor assembly of a wind turbine, such as one of the rotor 118, the hub 120, or one or more of the rotor blades 112 of the wind turbine 102, are illustrated. More specifically, FIG. 7 illustrates a schematic diagram of a system 400 for monitoring a rotor assembly of a wind turbine according to the present disclosure, whereas FIG. 8 illustrates a flow diagram of a method 500 for monitoring a rotor assembly of a wind turbine according to the present disclosure. In general, the system 400 may include any of the components illustrated in FIG. 4. Thus, as shown, the system 400 may include, at least, a controller 402, such as the farm controller 108, the turbine controller(s) 104, and/or other suitable controller according to the present disclosure. Further, as shown, the controller 402 may include an imaging analytics module 404 and a visualization module 406, the functions of which are described in more detail below. Remaining components of the system 400 are further explained below, with discussion of the method 500.

In general, as shown in FIG. 8, the method 500 is described herein as implemented for monitoring the rotor assembly of the wind turbine 102 described above. However, it should be appreciated that the disclosed method 500 may be used to monitor any other rotor assembly or component having any suitable configuration. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (502), the method 500 includes, during a model-building time period, receiving, via the imaging analytics module 404, the input data 408 described herein. As shown at (504), the method 500 includes automatically identifying, via a machine learning model 414 of the imaging analytics module 404, at least one anomaly and associated anomaly category information using the input data 408. In an embodiment, for example, the machine learning model 414 may include a deep learning neural network. Thus, in certain embodiments, the deep learning neural network may include a Convolution Neural Network (CNN) having an encoder-decoder architecture configured to implement semantic segmentation. Accordingly, the encoder-decoder architecture may be utilized for a semantic segmentation task. More particularly, the encoder network structure can learn the appropriate representation required to solve the given task while the decoder structure can combine the lower-level and higher-level representations to make a prediction. In on example, the prediction can be the probability map of each pixel belonging to a defect category. In another example, the first encoder-decoder structure can predict defect versus non-defect for each pixel and those pixels which were recognized as a defect can pass through another network for further classification into defect categories.

Figure 9:
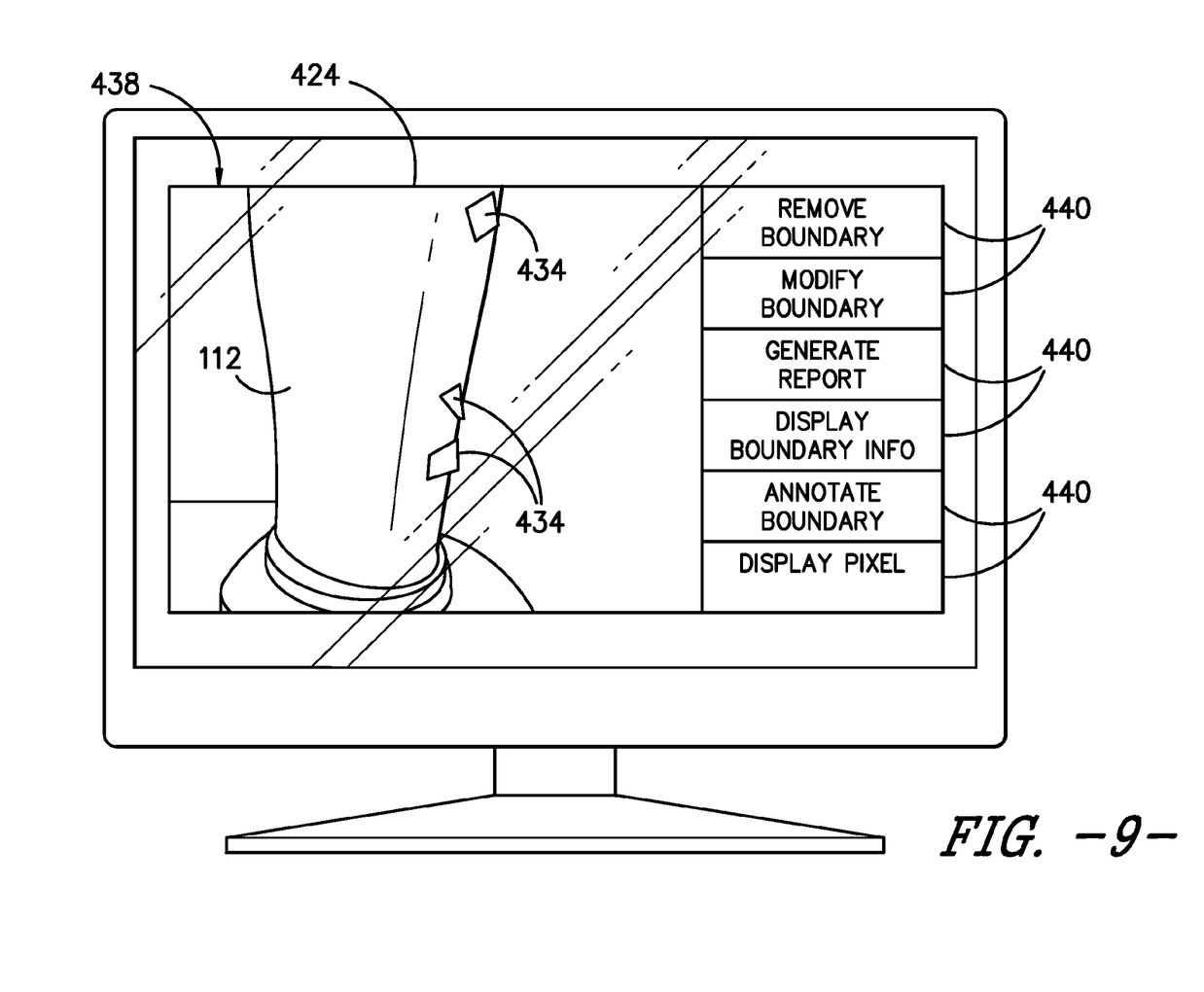
FIG. 9 illustrates a screenshot of a computer-generating image of a rotor assembly using the system and methods according to the present disclosure.

As shown at (506), the method 500 includes generating, via the imaging analytics module 404, output data 416 comprising pixel information that corresponds to the anomaly(ies) and the associated anomaly category information. For example, the output data 416 may include the pixels that are associated with the anomaly(ies), including size, shape, concentrations, etc. Further, the category information may include, for example, a type or severity of the anomaly(ies). Moreover, in additional embodiments, the method 500 may include combining pixels of adjacent regions belonging to a common anomaly category into a single anomaly region. Thus, in such embodiments, the method 500 may include fitting at least one boundary (such as one or more polygons) to the single anomaly region using at least one of connected components or convex hull fitting and displaying the boundary via the visualization module 406. Example boundaries 434 fitted to a plurality of defect regions are further illustrated in FIG. 9.

As shown at (508), during a model-implementing time period, the method 500 includes training the machine learning model 414 over time using the input data 408 and output data 424. Such training may include, for example, annotating the pixel information that corresponds to the anomaly and the associated anomaly category information over time, which may be completed by an expert operator. As such, in an embodiment, the operators can mark the pixels that belong to the defects/anomalies and their corresponding categories. Thus, the machine learning model 414 can be trained to predict defect pixel locations and the corresponding categories as accurately as possible to humans.

Further, as shown, the annotated output data 426 can then be stored in memory store 412. In particular embodiments, the imaging analytics module 404 may thus be configured to generate a probability map 428 for the pixel information (e.g. a probability map for each pixel belonging to a defect category). As used herein, the probability map 428 generally includes probabilities that each pixel actually corresponds to a particular anomaly and the associated anomaly category information. Accordingly, a higher probability indicates higher chance of that a pixel belongs to that defect category. Thus, in certain embodiments, the method 500 may include marking the pixel information with a confidence level above a certain threshold based on the probability map 428, thereby creating a confidence map 430 of the anomaly(ies) and the associated anomaly category information. As such, during deployment of the model 414, each pixel is associated with the highest probability category predicted for it by the network. Accordingly, the network can be either be directly trained to predict the defect pixel location and its category, or first trained to predict whether a pixel belongs to a defect versus a non-defect category and then each defect pixel classified to its corresponding defect category.

Referring to FIG. 8, as shown at (510), the method 500 includes generating, via the visualization module 406, an image of the rotor assembly, e.g. using the trained machine learning model 414. For example, in several embodiments, the image of the rotor assembly may be generating using an image stitching function 442 to stitch together the plurality of image frames. For example, an example computer-generated image 424 of the rotor assembly is provided in FIG. 9. Accordingly, in an embodiment, the method 500 may include monitoring the rotor assembly for anomalies using the computer-generated image of the rotor assembly. As such, the computer-generated image of the rotor assembly is configured to display an anomaly location and the associated anomaly category information overlaid as layer on the image of the rotor assembly and implementing a control action when at least one anomaly is detected.

More particularly, as shown, the computer-generated image 424 of the rotor assembly may be displayed on an interactive user interface 438 that allows a user to interact with the image, such as via touch-screen technology having one or more selectable buttons 440 or a user device, such as a mouse or keyboard, that allows a user to select various options. For example, in an embodiment, the method 500 may include, in response to receiving a selection of the boundary 434, displaying the associated anomaly category information and the pixel information via the visualization module 406. Further, in an embodiment, the method 500 may include receiving at least command via the visualization module 406. For example, such commands may include removing or modifying the boundary or changing the associated anomaly category information.

Thus, in further embodiments, the method 500 may also include verifying at least one of the plurality of thermal images, the boundary(ies), the anomaly or anomalies, the associated anomaly category information, or meta information related to inspection of the rotor assembly and generating a report 432 via the visualization module 406. Accordingly, as shown in FIG. 7, the method 500 may further include training the machine learning model 414 over time using the report 432.

Various aspects and embodiments of the present invention are defined by the following numbered clauses:

Clause 1. A method for monitoring at least one rotor assembly of a wind turbine, the rotor assembly comprising at least one of a rotatable hub and at least one rotor blade, the method comprising:

receiving, via an imaging analytics module of a controller, thermal imaging data of the rotor assembly, the thermal imaging data comprising a plurality of image frames;

automatically identifying, via a first machine learning model of the imaging analytics module, a plurality of sections of the rotor assembly within the plurality of image frames until all sections of the rotor blade are identified;

selecting, via a function of the imaging analytics module, a subset of image frames from the plurality of image frames, the subset of image frames comprising a minimum number of the plurality of image frames required to represent all sections of the rotor blade;

generating, via a visualization module of the controller, an image of the rotor assembly using the subset of image frames.

Clause 2. The method of clause 1, wherein the thermal imaging data comprises infrared imaging data, the method further comprising colleting the infrared imaging data by scanning the rotor assembly via one or more infrared imaging devices.

Clause 3. The method of any of the preceding clauses, wherein the first machine learning model comprises a deep learning neural network.

Clause 4. The method of any of the preceding clauses, further comprising aggregating image frames of the plurality of image frames from common sections of the plurality of sections until each of the plurality of sections is represented.

Clause 5. The method of any of the preceding clauses, wherein the plurality of sections of the rotor blade comprise at least one of a blade root section, an intermediate blade section, or a blade tip section.

Clause 6. The method of any of the preceding clauses, further comprising automatically identifying, via the imaging analytics module, one or more components of the rotor blade within the plurality of image frames, wherein the one or more components of the rotor blade comprise at least one of a blade root, a blade tip, a lug nut, a leading edge, a trailing edge, a pressure side, a suction side, or a maximum chord.

Clause 7. The method of clause 6, further comprising automatically identifying, via a second machine learning model of the imaging analytics module, a blade axis of the rotor blade using the one or more components.

Clause 8. The method of clause 7, wherein automatically identifying, via the second machine learning model of the imaging analytics module, the blade axis of the rotor blade using the one or more components further comprises:

detecting a position of the lug nut within the plurality of image frames; and automatically identifying, via the second machine learning model, the blade axis of the rotor blade based on the position of the lug nut.

Clause 9. The method of any of the preceding clauses, wherein the function of the imaging analytics module comprises at least one of a metric function or an image stitching function.

Clause 10. The method of clause 9, wherein the metric function comprises at least one of a normalized cross correlation, a sum of an absolute difference, optical flow, or a learned distance metric function.

Clause 11. The method of clause 9, further comprising training the function via a machine learning algorithm.

Clause 12. The method of any of the preceding clauses, further comprising:

monitoring the image of the rotor assembly for anomalies on the rotor assembly; and implementing a control action when at least one anomaly is detected.

Clause 13. A method for monitoring a rotor assembly of a wind turbine, the rotor assembly comprising at least one of a rotatable hub and at least one rotor blade, the method comprising:

during a model-building time period, receiving, via an imaging analytics module of a controller, input data comprising a plurality of thermal images of the rotor assembly or another rotor assembly, the plurality of thermal images comprising a plurality of image frames;

automatically identifying, via a machine learning model of the imaging analytics module, at least one anomaly and associated anomaly category information using the input data;

generating, via the imaging analytics module, output data comprising pixel information that corresponds to the at least one anomaly and the anomaly category information;

during a model-implementing time period, training the machine learning model over time using the input data and the output data; and generating, via a visualization module of the controller, an image of the rotor assembly using the trained machine learning model.

Clause 14. The method of clause 13, wherein the machine learning model comprises a deep learning neural network.

Clause 15. The method of clause 14, wherein the deep learning neural network comprises a Convolution Neural Network (CNN) having an encoder-decoder architecture configured to implement semantic segmentation.

Clause 16. The method of clause 15, wherein training the machine learning model using the input data and output data further comprises:

annotating the pixel information that corresponds to the anomaly and the associated anomaly category information over time; and storing the annotated pixel information; and generating a probability map for the pixel information, the probability map comprising probabilities that each of the pixel information actually corresponds to the anomaly and the anomaly category information.

Clause 17. The method of clause 16, further comprising, based on the probability map, marking the pixel information with a confidence level above a certain threshold to create a confidence map of the at least one anomaly and the associated anomaly category information.

Clause 18. The method of clause 16, further comprising combining pixels of adjacent regions belonging to a common anomaly category into a single anomaly region.

Clause 19. The method of clause 18, further comprising fitting at least one boundary to the single anomaly region using at least one of connected components or convex hull fitting and displaying the boundary via the visualization module.

Clause 20. The method of clause 19, further comprising: in response to receiving a selection of the boundary, displaying the associated anomaly category information and the pixel information via the visualization module.

Clause 21. The method of clause 19, further comprising: receiving at least command via the visualization module, the command comprising at least one of removing or modifying the at least one boundary or changing the associated anomaly category information.

Clause 22. The method of clause 19, further comprising verifying at least one of the plurality of thermal images, the boundary, the at least one anomaly, the associated anomaly category information, or meta information related to inspection of the rotor assembly and generating a report via the visualization module.

Clause 23. The method of clause 22, further comprising training the machine learning model over time using the report.

Clause 24. The method of clauses 13-23, further comprising:
monitoring the rotor assembly for anomalies using the image of the rotor assembly, the image of the rotor assembly displaying an anomaly location and the associated anomaly category information overlaid as layer on the image of the rotor assembly; and
implementing a control action when at least one anomaly is detected.

Clause 25. The method of clauses 13-24, wherein the visualization module comprises at least one of a physical display monitor or a web application.

Clause 26. The method of clauses 13-25, wherein generating the image of the rotor assembly further comprises utilizing an image stitching function to stitch together the plurality of image frames.

Clause 27. A system for monitoring a rotor assembly of a wind turbine, the rotor assembly comprising at least one of a rotatable hub and at least one rotor blade, the method comprising, the system comprising:
a controller comprising:
an imaging analytics module configured to perform a plurality of operations, the plurality of operations comprising:
during a model-building time period, receiving input data comprising thermal imaging data of the rotor assembly, the thermal imaging data comprising a plurality of image frames;
automatically identifying, via a machine learning model of the imaging analytics module, a plurality of sections of the rotor blade within the plurality of image frames until all sections of the rotor blade are identified;
selecting, via a function of the imaging analytics module, a subset of image frames from the plurality of image frames, the subset of image frames comprising a minimum number of the plurality of image frames required to represent all sections of the rotor blade;
automatically identifying, via the machine learning model, at least one anomaly and associated anomaly category information within the subset of image frames;
generating output data comprising pixel information that corresponds to the at least one anomaly and the anomaly category information; and
during a model-implementing time period, training the machine learning model over time using the input data and output data; and
a visualization module configured to generate an image of the rotor assembly using the trained machine learning model.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring at least one rotor assembly of a wind turbine, the rotor assembly comprising at least one of a rotatable hub and at least one rotor blade, the method comprising:
receiving, via an imaging analytics module of a controller, thermal imaging data of the rotor assembly, the thermal imaging data comprising a plurality of image frames;
automatically identifying, via a first machine learning model of the imaging analytics module, a plurality of sections of the rotor assembly within the plurality of image frames until all sections of the rotor blade are identified;
automatically identifying, via the imaging analytics module, one or more components of the rotor blade within the plurality of image frames;
automatically identifying, via a second machine learning model of the imaging analytics module, a blade axis of the rotor blade using the one or more components, wherein automatically identifying, via the second machine learning model of the imaging analytics module, the blade axis of the rotor blade using the one or more components further comprises:
detecting a position of the one or more components within the plurality of image frames; and
automatically identifying, via the second machine learning model, the blade axis of the rotor blade based on the position of the one or more components;
selecting, via a function of the imaging analytics module, a subset of image frames from the plurality of image frames, the subset of image frames comprising a minimum number of the plurality of image frames required to represent all sections of the rotor blade; and
generating, via a visualization module of the controller, a complete image of the rotor assembly using the subset of image frames comprising all sections of the rotor blade.

2. The method of claim 1, wherein the thermal imaging data comprises infrared imaging data, the method further comprising collecting the infrared imaging data by scanning the rotor assembly via one or more infrared imaging devices.

3. The method of claim 1, wherein the first machine learning model comprises a deep learning neural network.

4. The method of claim 1, further comprising aggregating image frames of the plurality of image frames from common sections of the plurality of sections until each of the plurality of sections is represented.

5. The method of claim 1, wherein the plurality of sections of the rotor blade comprise at least one of a blade root section, an intermediate blade section, or a blade tip section.

6. The method of claim 1, wherein the one or more components of the rotor blade comprise at least one of a blade root, a blade tip, a lug nut, a leading edge, a trailing edge, a pressure side, a suction side, or a maximum chord.

7. The method of claim 1, wherein automatically identifying, via the second machine learning model of the imaging analytics module, the blade axis of the rotor blade using the one or more components further comprises:
detecting a position of the lug nut within the plurality of image frames; and
automatically identifying, via the second machine learning model, the blade axis of the rotor blade based on the position of the lug nut.

8. The method of claim 1, wherein the function of the imaging analytics module comprises at least one of a metric function or an image stitching function.

9. The method of claim 8, wherein the metric function comprises at least one of a normalized cross correlation, a sum of an absolute difference, optical flow, or a learned distance metric function.

10. The method of claim 8, further comprising training the function via a machine learning algorithm.

11. The method of claim 1, further comprising:
monitoring the image of the rotor assembly for anomalies on the rotor assembly; and
implementing a control action when at least one anomaly is detected.

* * * * *